United States Patent
Thronton

[19]

[11] Patent Number: 5,996,631
[45] Date of Patent: Dec. 7, 1999

[54] CHECK VALVE

[75] Inventor: Christopher Douglas Thronton, South Bend, Ind.

[73] Assignee: Robert Bosch Technology Corporation, Broadview, Ill.

[21] Appl. No.: 09/293,480

[22] Filed: Apr. 15, 1999

[51] Int. Cl.[6] .................................................. F16K 15/14
[52] U.S. Cl. .......................................... 137/854; 137/852
[58] Field of Search .................................. 137/854, 852; 251/843, 118

[56] References Cited

U.S. PATENT DOCUMENTS

| | | | |
|---|---|---|---|
| 3,465,786 | 9/1969 | Spisak | 137/516.27 |
| 3,626,978 | 12/1971 | Hoekstra | 137/854 |
| 3,633,613 | 1/1972 | Julow | 137/854 |
| 4,535,820 | 8/1985 | Raines | 137/854 |
| 4,550,749 | 11/1985 | Krikorian | 137/854 |
| 4,711,224 | 12/1987 | Eckhardt | 137/854 |
| 4,749,003 | 6/1988 | Leason | 137/854 |
| 4,886,085 | 12/1989 | Miller | 137/526 |
| 5,067,449 | 11/1991 | Bonde | 137/854 |
| 5,129,426 | 7/1992 | Boehmer | 137/854 |
| 5,794,915 | 8/1998 | Shimizu et al. | 251/118 |

*Primary Examiner*—Denise L. Ferensic
*Assistant Examiner*—Joanne Y. Kim
*Attorney, Agent, or Firm*—Leo H. McCormick J.; Warren Comstock

[57] ABSTRACT

A method of setting a gap between a poppet member and a seat in a check valve by sensing the position of an cylindrical projection extending from an end cap while sonically welding the end cap to a housing

7 Claims, 2 Drawing Sheets

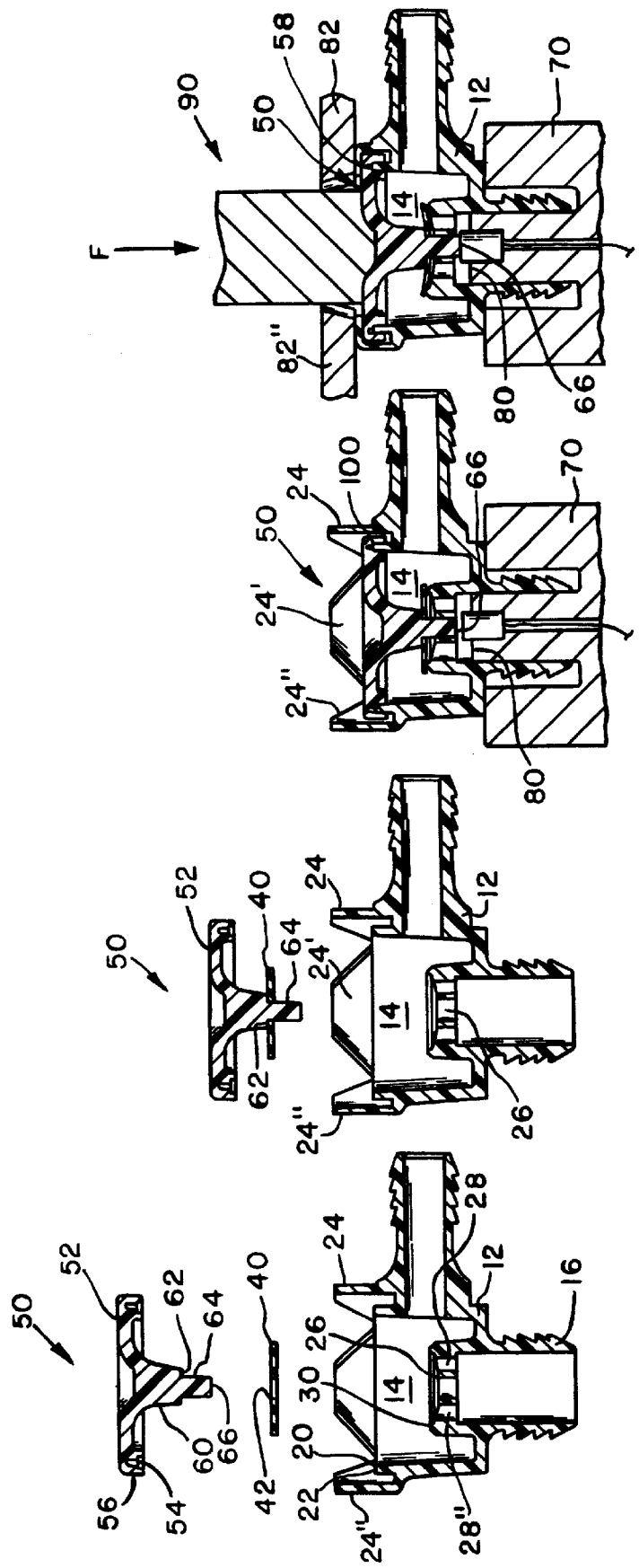

CHECK VALVE

This invention relates to a method of making check valve wherein an end cap is sonically welded to a housing while sensing the position of a cylindrical projection extending for the end cap is define a gap between a poppet and a seat

BACKGROUND OF THE INVENTION

It is common practice to use a check valve between a manifold and various devices which use vacuum as an operational power source such as a brake booster to maintain a substantially constant level of vacuum in the device. When a desired level of vacuum is achieved, a poppet engages a seat to sustain the such desired level. U.S. Pat. No. 3,626,978 discloses such a typical check valve wherein a poppet member is retained on a post of a housing by an end cap to control the evacuation of air from a chamber in a brake booster toward the manifold. In an effort to maintain a desired alignment between a poppet and seat, it is disclosed in U.S. Pat. No. 4,886,085 to provide dual stems to guide the axial movement of the poppet. In these check valve it is common practice to join the end cap to the body through a mechanical connection or a combination of a mechanical connection and a some type of welding. These check valve function in an adequate manner for most operations, however during the flow of small volumes of air it is possible to create unwanted noise.

In evaluating the creation of noise, it was found that the tolerances created in defining the gap between the poppet and annular seat significantly contributed to the development of noise. If the distance required to move the poppet away from the seat was maintained within desired limits the development of noise was essentially eliminated.

SUMMARY OF THE INVENTION

In the present invention, the gap for the poppet valve is set during the manufacture of the check valve by controlling the force applied to sonically weld the end cap to the body. In this method of making a check valve, which has a housing, poppet member and end cap. The housing has a chamber therein with an entrance port and an exit port. The housing has a first opening which surrounds a first annular shoulder which in turn is in axial alignment with a second opening which is connected with the entrance port. A plurality of passages surround the second opening to connect the chamber with the entrance port while the housing has an annular seat which extends into the chamber and surrounds the plurality of passages. The housing is positioned in a fixture such that a stop or position sensor is adjacent the second opening. An end cap is obtained from a source of supply. The end cap has a base to with an annular groove located adjacent a peripheral edge and a conical projection that extends from adjacent the annular groove to a second annular shoulder to form a base for a cylindrical projection which extends a predetermined distance therefrom to define an end or apex. A flexible poppet is placed on the cylindrical projection. Thereafter, the end cap is aligned with first opening and the cylindrical projection is moved into the second opening of the housing such that first annular groove receives the first annular shoulder. A first force is applied to the end cap to move the first annular shoulder into an annular line of engagement with the first annular groove. A sonic welder is thereafter actuated and a second force is applied to the end cap to create a weld line along the line of engagement to seal the chamber and define a unitary structure. The second force is maintained on the end cap until the end or apex of the cylindrical projection engages the stop of the sonic welder. When the cylindrical projection engages the stop a predetermined gap is set between the second annular shoulder and the annular seat. Thereafter a third force is applied to a plurality of axial tabs, the axial tabs being offset from the first annular shoulder, to deform and bring the plurality of tabs into engagement with end cap and complete the manufacture of the check valve. This mechanical engagement will assist in maintaining the gap should the weld fail along the line of engagement.

An advantage of the present check valve resides in controlling the development of a gap between a shoulder on an end cap and a seat to reduce the creation of noise caused by low flow of air between an entrance port and an exit port.

A further advantage of this method of manufacturing a check valve resides in the development of a gap between a poppet and a seat wherein an end cap that carries the poppet has a cylindrical member engages a stop to provide a sonic welder with an input to terminate a force applied to join the end cap with a housing and form a unitary structure.

BRIEF DESCRIPTION OF THE DRAWINGS

FIG. 1 is a sectional view of various components of a check valve made according to the present invention wherein a body thereof is located in a fixture;

FIG. 2 is a sectional view of FIG. 1 wherein a poppet member is positioned on an end cap;

FIG. 3 is a sectional view of FIG. 1 wherein the end the end cap with the poppet member is brought into engagement with the body;

FIG. 4 is a sectional view of the FIG. 1 wherein a sonic welder is brought into engagement with the fixture to join the end cap with the body;

DETAILED DESCRIPTION

Figure 6:
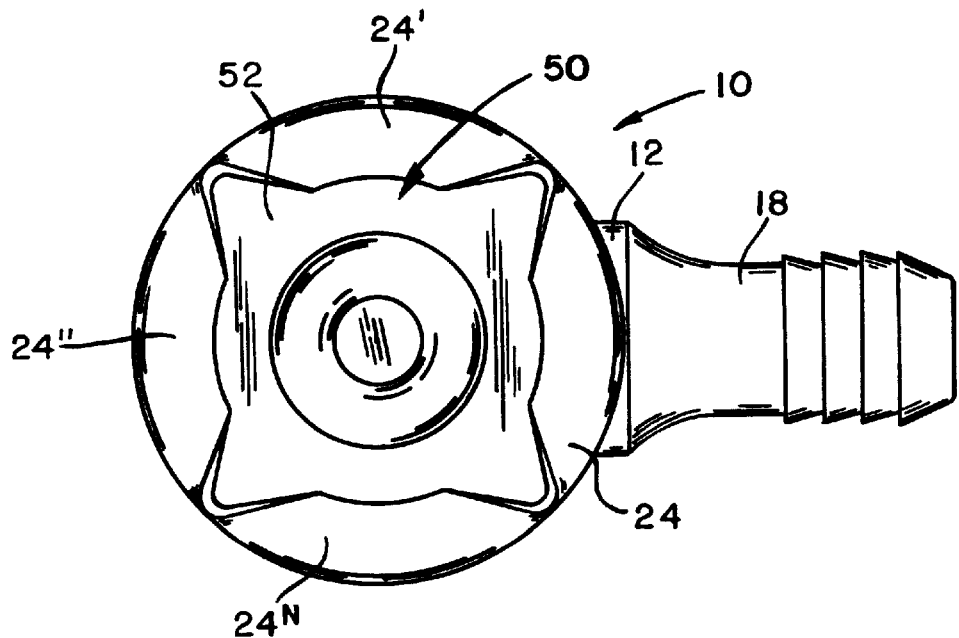
FIG. 6 is an end view of FIG. 5 taken along lines 5—5.
Figure 5:
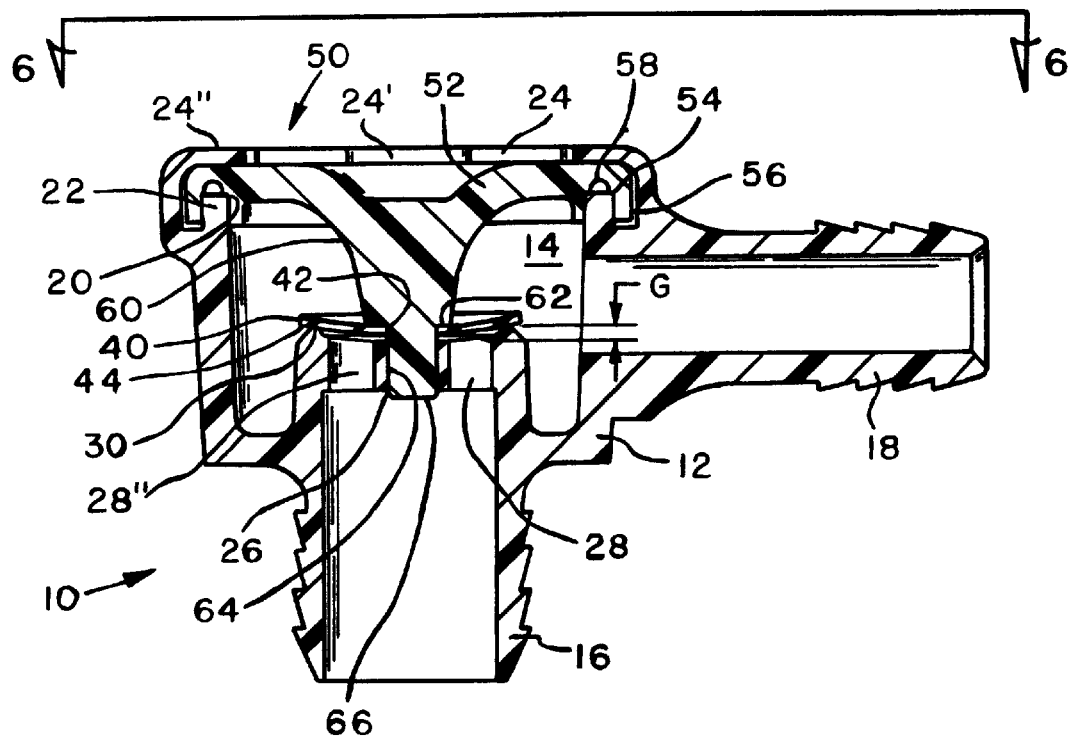
FIG. 5 is a sectional view of a check valve made according to method illustrated in FIGS. 1 through 4.

The check valve 10 shown in FIG. 5 a housing or body 12 with a poppet member 40 positioned in a chamber 14 by an end cap 50.

Chamber 14 has an inlet port 16 designed to be connected to a brake system and an outlet port 18 designed to be connected to a source of vacuum such as the intake manifold of an internal combustion engine in a vehicle. The housing 12 has a first opening 20 formed by annular shoulder 22 which is surrounded by a plurality of axial tabs 24, 24' . . . 24" which are offset from the annular shoulder 22. The housing 12 has a second opening 26 in axial alignment with the first opening 20 which is surrounded by a plurality of passages 28, 28' . . . 28" through which chamber 14 is connected with the inlet port 16. An annular seat 30 which surrounds the plurality of passages 28, 28' . . . 28" projects from the into chamber 14 housing 12.

The end cap 50 has a base in the shape of a disc 52 which is joined to housing 12 to close the first opening 20. Disc 52 has an annular groove 54 which is located adjacent a peripheral surface 56 for receiving the annular shoulder 22. Annular groove 54 has a corresponding central relief slot 58 for the storage material displaced during the joining of the disc 52 with housing 12. End cap 50 has an conical axial projection 60 which extends from adjacent the annular groove 54 to an annular shoulder 62. Annular shoulder 62 forms a base for an axial cylindrical projection 64 which extends for a predetermined distance to an end or apex 66 from the annular shoulder 62. This predetermined distance is a controlling parameter for establishing a gap G between the plurality of passages 28, 28' . . . 28" and/or seat 30 and poppet member 40. The plurality of axial tabs 24, 24' . . . 24" are deformed to engage disc 52 to assure that gap G is maintained should a failure occur in the weld between the disc 52 and housing 12.

The poppet member 40 is made of a flexible material has a central opening 42 which resiliently engages the cylindrical projection 64 and a diameter sufficient to extend past the plurality of passages 28, 28' . . . 28". Poppet member 40 engages shoulder 62 such that an axial force is always applied to seat the surface 44 on annular seat 30 to control the communication between chamber 14 and the inlet port 16.

METHOD OF MANUFACTURE

The check valve 10 and the setting of the gap G is achieved through the following steps.

A housing 12 is obtained from a supply source. The housing 12 has a chamber 14 therein with an entrance port 16 and an exit port 18 and a first opening 20 in axial alignment with a second opening 26. The first opening 20 is surrounded a first annular shoulder 22 with a plurality of axial tabs 24, 24' . . . 24" offset from the first annular shoulder 22. The second opening 26 is surrounded by a plurality of passages 28, 28' . . . 28" for connecting the chamber 14 with the entrance port 16. The housing 12 has an annular seat 30 which projects from the housing into chamber 14 and surrounds the plurality of passages 28, 28' . . . 28".

An end cap 50 is obtained from a source of supply. End cap 50 has a disc shaped base 52 with an annular groove 54 located adjacent a peripheral edge 56 and a conical projection 60 which extends from adjacent the annular groove 54 to an annular shoulder 62. Annular shoulder 62 forms a base for a cylindrical projection 64 which extends for a predetermined distance to an end or apex 66.

A poppet member 40 is obtained from a source of supply. Poppet member 40 is disc shaped and made from a flexible such as rubber. The poppet member 40 has a central opening 42 which expands in order to place the poppet member 40 on cylindrical projection 64 as illustrated in FIG. 2. The housing 12 is placed on a fixture 70 to position a stop or sensor 80 adjacent the second opening 26 as illustrated in FIG. 1. The end cap 50 with the poppet member 40 attached thereto is aligning with the first opening 20 and moving toward the housing 12 to bring the cylindrical projection 64 into the second opening 26 of the housing 12 such that first annular groove 54 receives the annular shoulder 22 as shown in FIG. 3. A first force is applied to the end cap 50 to move the first annular shoulder 22 into an annular line of engagement 100 with the annular groove 54. A sonic welder, Model No. Millenium 2000 having a frequency of 20 Khz sold by Dukane Corporation, associated with fixture 80 is actuated to bring member 90 into engagement with end cap 50 to establish a weld line along the line of engagement 100 and seal chamber 14 to define a unitary structure. During the welding process, member 90 applies a second force to the end cap 50 to move the second annular shoulder 62 toward the plurality of openings 28, 28' . . . 28". This second force is maintained on the end cap 50 until end or apex 66 of the cylindrical projection 64 engages stop 80 as illustrated in FIG. 4. Engagement with stop 80 actuates a sensor within the sonic welder to terminate the second force and set a predetermined gap G between the second annular shoulder 62 and the annular seat 30 and plurality of openings 28, 28' . . . 28". The second force which is continually applied to the end cap 50 to move the end cap 50 toward the housing 12 and develop the desired gap G causes material to flow into the relief slot 58 as a result of the sonic welding process. When the desired gap G has been achieved, a lateral force is applied to the plurality of axial tabs 24, 24' . . . 24" by members 82, 82' . . . 82" to deform the tabs 24, 24' . . . 24" into engagement with end cap 50 and assist in maintaining gap G should a failure occur in the weld created between the annular shoulder 22 and bottom of annular groove 54.

MODE OF OPERATION

When check valve 10 is installed in a vehicle having an internal combustion engine, outlet port 18 is connected to the intake manifold and entrance port 16 is connected to a device such as a vacuum brake booster. Actuation power of a vacuum brake booster to develop a brake force is achieved through the development of a pressure differential created across a movable wall between vacuum in a first chamber and air in a second chamber. On termination of the desired brake force, the air is evacuated from the second chamber in the vacuum brake booster through the check valve 10. Air flows from the inlet port 1 6 through chamber 14 to the outlet port 18. Initially the flow of air is rapid and air flow moves the poppet member off seat 30. In this situation, air freely flows into chamber 14 before exiting through outlet port 18 to the intake manifold. It is anticipated that the curved surface provided by the conical axial projection 60 assist in reducing noise or turbulence as no noticeable noise is created. The flow of air decreases as the fluid pressure in the device approaches the fluid pressure of the vacuum available in the intake manifold and as a result, poppet members in which the gap G is not within predetermined set limits have a tendency to flutter. However, in the present invention, the setting of the gap G between the second annular shoulder 62 and the plurality of passages 24, 24' . . . 24" provides a constant force on the poppet member 40 to substantially eliminate the fluttering during low flow of air through the check valve 10.

I claim:

1. A check valve comprising:

a housing having a valve chamber therein with an inlet port and an outlet port, said inlet port being connected to a brake system and said outlet port being connected to a source of vacuum, said housing having a first opening surrounded by a first annular shoulder with a plurality of axial tabs offset from said first annular shoulder, said housing a second opening surrounded by a plurality of passages for connecting said chamber with said inlet port, said plurality of passages being surrounded by an annular seat;

an end cap located in said first opening, said end cap having a disc with an annular groove located adjacent a peripheral surface for receiving said first annular shoulder, said disc having a relief slot connected to said annular groove, said end cap having an conical axial projection which extends from adjacent said annular groove to a second annular shoulder which forms a base of an axial cylindrical projection, said axial cylindrical projection having an end located a predetermined distance from said second annular shoulder; and a flexible poppet aligned on said cylindrical projection by a axial opening and engaging said second annular shoulder, said end cap being welded to said housing along a line of the engagement between said first annular shoulder and said annular groove to form a unitary structure by sealing said first opening of said chamber, said line of engagement a defining a gap between said second shoulder and said annular seat such that said flexible poppet resiliently engages said annular seat to control communication between said chamber and said inlet port through said plurality of passages, said plurality of axial tabs being deformed to engage said end cap and reinforce said seal along said line of engagement.

2. The check valve as recited in claim 1 wherein said conical axial projection assists in reducing noise caused by the flow of air from said inlet port through the chamber to said outlet port.

3. The check valve as recited in claim 2 wherein said relief slot allows material to flow during the welding along the line of engagement to permit the development of said gap.

4. A method of making a check valve comprising the steps:

obtaining a housing from a supply, said housing having a chamber therein with an entrance port and an exit port and a first opening surrounded a first annular shoulder with a plurality of axial tabs offset from said first annular shoulder, said housing having a second opening surrounded by a plurality of passages for connecting said chamber with said entrance port, said housing having an annular seat in said chamber which surrounds said plurality of passages;

placing said housing on a fixture with a sensor inserted in said entrance port to a position adjacent said second opening;

obtaining an end cap from a supply, said end cap having a base with an annular groove located adjacent a peripheral edge and a conical projection which extends from adjacent said annular groove to a second annular shoulder which forms a base for a cylindrical projection, said cylindrical projection extending a predetermined distance to an end;

placing a flexible poppet on said cylindrical projection;

aligning said end cap with said first opening and moving said cylindrical projection into said second opening of said housing such that said annular groove receives said first annular shoulder;

applying a first force to said end cap to move said first annular shoulder into an annular line of engagement with said annular groove;

actuating a sonic welder while applying a second force to said end cap to create a weld line along said line of engagement to seal said chamber and define a unitary structure; and maintaining said second force on said end cap until said end of said cylindrical projection actuates said sensor to set a predetermined gap between said second annular shoulder and said annular seat.

5. The method of making a check valve as recited in claim 4 further including the step of:

applying a force to deform said plurality of axial tabs and bring said tabs into engagement with end cap to assist in maintaining said gap should said weld fail.

6. The method of making a check valve as recited in claim 5 further including the step of:

providing a relief slot in said end cap which is connected to said annular groove to store material during welding to allow said cylindrical project to move toward said sensor in defining said gap.

7. The check valve made through the method as recited in claim 6.

* * * * *